(12) United States Patent
Li et al.

(10) Patent No.: US 7,068,478 B2
(45) Date of Patent: Jun. 27, 2006

(54) CPP GMR READ HEAD

(75) Inventors: Min Li, Fremont, CA (US); Kunliang Zhang, Fremont, CA (US); Rachid Sbiaa, Nagano (JP); Cheng T. Horng, San Jose, CA (US); Simon Liao, Fremont, CA (US); Kochan Ju, Monte Sereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 355 days.

(21) Appl. No.: 10/631,840

(22) Filed: Jul. 31, 2003

(65) Prior Publication Data

US 2005/0024792 A1 Feb. 3, 2005

(51) Int. Cl.
*G11B 5/39* (2006.01)
*C21D 1/04* (2006.01)
*G11C 11/00* (2006.01)

(52) U.S. Cl. ............ 360/324.11; 148/108; 29/603.08; 29/630.14; 365/158; 365/171

(58) Field of Classification Search ........... 360/324.11, 360/324.12, 324.2; 148/108; 29/603.08, 29/603.14

See application file for complete search history.

(56) References Cited

U.S. PATENT DOCUMENTS

| | | | |
|---|---|---|---|
| 6,338,899 B1 | 1/2002 | Fukuzawa et al. | 428/332 |
| 6,340,533 B1 | 1/2002 | Ueno et al. | 428/611 |
| 6,430,015 B1 | 8/2002 | Ju et al. | 360/327.32 |
| 6,456,469 B1 | 9/2002 | Gill | 360/324.11 |
| 6,462,541 B1 | 10/2002 | Wang et al. | 324/252 |
| 6,493,195 B1 | 12/2002 | Hayashi et al. | 360/322 |
| 6,882,510 B1 * | 4/2005 | Parker et al. | 360/324.11 |
| 6,943,994 B1 * | 9/2005 | Zheng et al. | 360/324.12 |

FOREIGN PATENT DOCUMENTS

JP    2001298224 A  * 10/2001

* cited by examiner

*Primary Examiner*—William J. Klimowicz
(74) *Attorney, Agent, or Firm*—Saile Ackerman LLC; Stephen B. Ackerman

(57) ABSTRACT

Replacing ruthenium with rhodium as the AFM coupling layer in a synthetically pinned CPP GMR structure enables the AP1/AP2 thicknesses to be increased. This results in improved stability and allows the free layer and AFM layer thicknesses to be decreased, leading to an overall improvement in the device performance. Another key advantage of this structure is that the magnetic annealing requirements (to establish antiparallelism between AP1 and AP2) can be significantly relaxed.

20 Claims, 2 Drawing Sheets

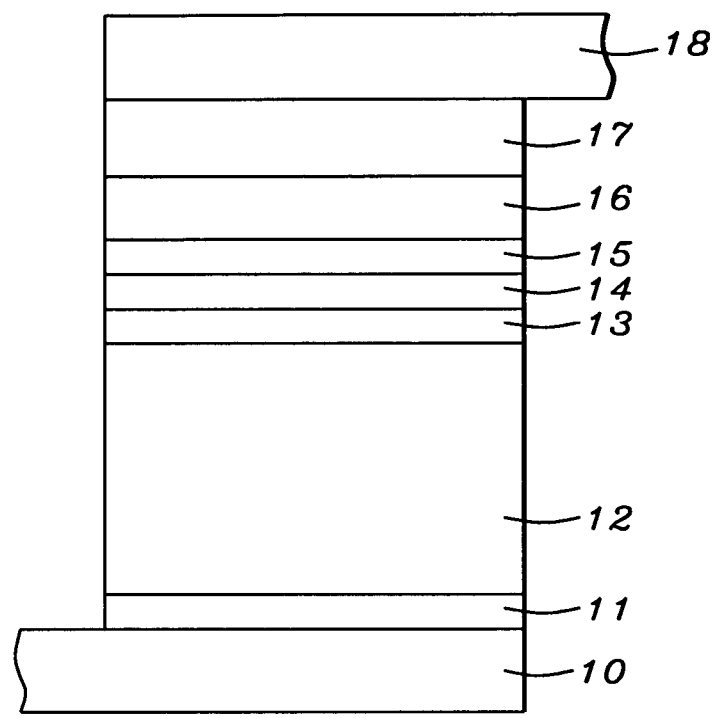
FIG. 1 – Prior Art
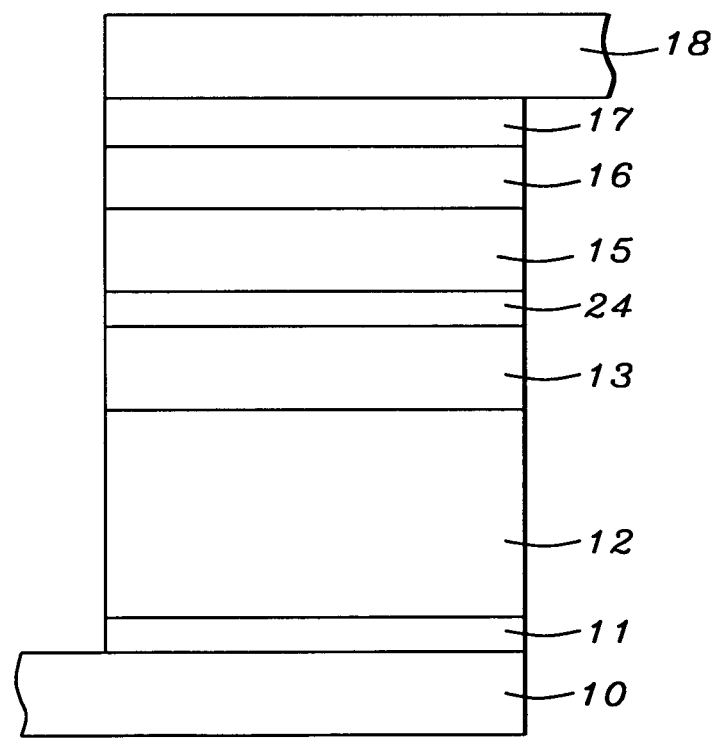
FIG. 2

CPP GMR READ HEAD

FIELD OF THE INVENTION

The invention relates to the general field of CPP GMR read heads with particular reference to the AP1–AP2 substructure.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are illustrated in FIG. 1. They are seed layer 11 on which is antiferromagnetic layer 12 whose purpose is to act as a pinning agent for a magnetically pinned layer. The latter is a synthetic antiferromagnet formed by sandwiching antiferromagnetic coupling layer 14 between two antiparallel ferromagnetic layers 13 (AP2) and 15 (AP1). In principle, any non-magnetic material could be used for layer 14 but some are more efficient than others, as will be discussed in greater detail below.

Next is a copper spacer layer 16 on which is low coercivity (free) ferromagnetic layer 17. A contacting layer such as lead 18 lies atop free layer 17. When free layer 17 is exposed to an external magnetic field, the direction of its magnetization is free to rotate according to the direction of the external field. After the external field is removed, the magnetization of the free layer will stay at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8–20%.

Most GMR devices have been designed so as to measure the resistance of the free layer for current flowing parallel to its two surfaces. However, as the quest for ever greater densities has progressed, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible. In contrast, in a CPP device, the total transverse resistance of all layers, other than the free layer, should be as low as possible so that resistance changes in the free layer can dominate.

A related device to the CPP GMR described above is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ cell in magnetic RAMs is the change of resistivity of the tunnel junction between two ferromagnetic layers. When the magnetizations of the pinned and free layers are in opposite directions, the tunneling resistance increases due to a reduction in the tunneling probability. The change of resistance is typically 40%, which is much larger than for GMR devices.

Currently, all CIP devices use 8 Å of Ru as their choice of antiferromagnetic coupling material with an AP1/AP2 thickness in the range of 10–30 Å. In the CIP case, the AP1 and AP2 thickness cannot be increased since it will reduce the CIP GMR. Although Rh or Ru4 are known to increase the antiferromagnetic coupling strength 2–4 times relative to Ru8, a much higher annealing field (over 30 kOe) is needed. It is therefore not practical to use Rh or Ru4 for CIP structures.

Currently, all prior art CPP devices continue to use the same structure that was developed for CIP devices (Ru8 with AP1/AP2 in the range of 20–40 Å of CoFe) since it has been reasonable to assume that the same very high field during annealing would be needed.

The present invention discloses how Rh and Ru4 may be used, thereby increasing the CPP GMR, without the need of the afore-mentioned very high annealing fields A routine search of the prior art was performed with the following references of interest being found:

In U.S. Pat. No. 6,493,195, Hayashi et al describe using Rh between pinned layers. In U.S. Pat. No. 6,462,541, Wang et al disclose Rh as an antiferromagnetic coupling layer. Grill (U.S. Pat. No. 6,456,469) teaches that any suitable non-magnetic material can be used between the pinned layers, but that Ru is preferred. Many other patents also teach that many materials are suitable. U.S. Pat. No. 6,430,015 (Ju et al)—a Headway patent—shows that Rh, Cr, and Ir can be substituted for Ru. Ueno et al. (U.S. Pat. No. 6,340,533) teaches using Cr, Rh, Ir, and alloys of Ru. Finally, in U.S. Pat. No. 6,338,899, Fukuzawa et al. show that Ru, Rh, Cr, and Ir, or the like, can be used between the pinned layers.

SUMMARY OF THE INVENTION

It has been an object of at least one embodiment of the present invention to provide a CPP GMR magnetic read head having improved stability and performance.

Another object of at least one embodiment of the present invention has been to provide a process for manufacturing said read head.

Still another object of at least one embodiment of the present invention has been that said process be compatible with existing processes for the manufacture of CPP GMR devices.

These objects have been achieved by using Rh as the AFM coupling layer in a synthetically pinned CPP GMR structure. This enables the AP1/AP2 thicknesses to be increased, which results in improved stability since the pinning field is increased, and for the free layer leading to an overall improvement in the device performance. Another key advantage of this structure is that the magnetic annealing requirements (to establish effective exchange coupling between AP1 and AP2) can be significantly relaxed.

BRIEF DESCRIPTION OF THE DRAWINGS

FIG. 1 shows a GMR stack of the prior art in which AFM coupling is achieved through Ru.

FIG. 2 shows a bottom spin valve manufactured according to the teachings of the present invention.

DESCRIPTION OF THE PREFERRED EMBODIMENTS

Figure 3:
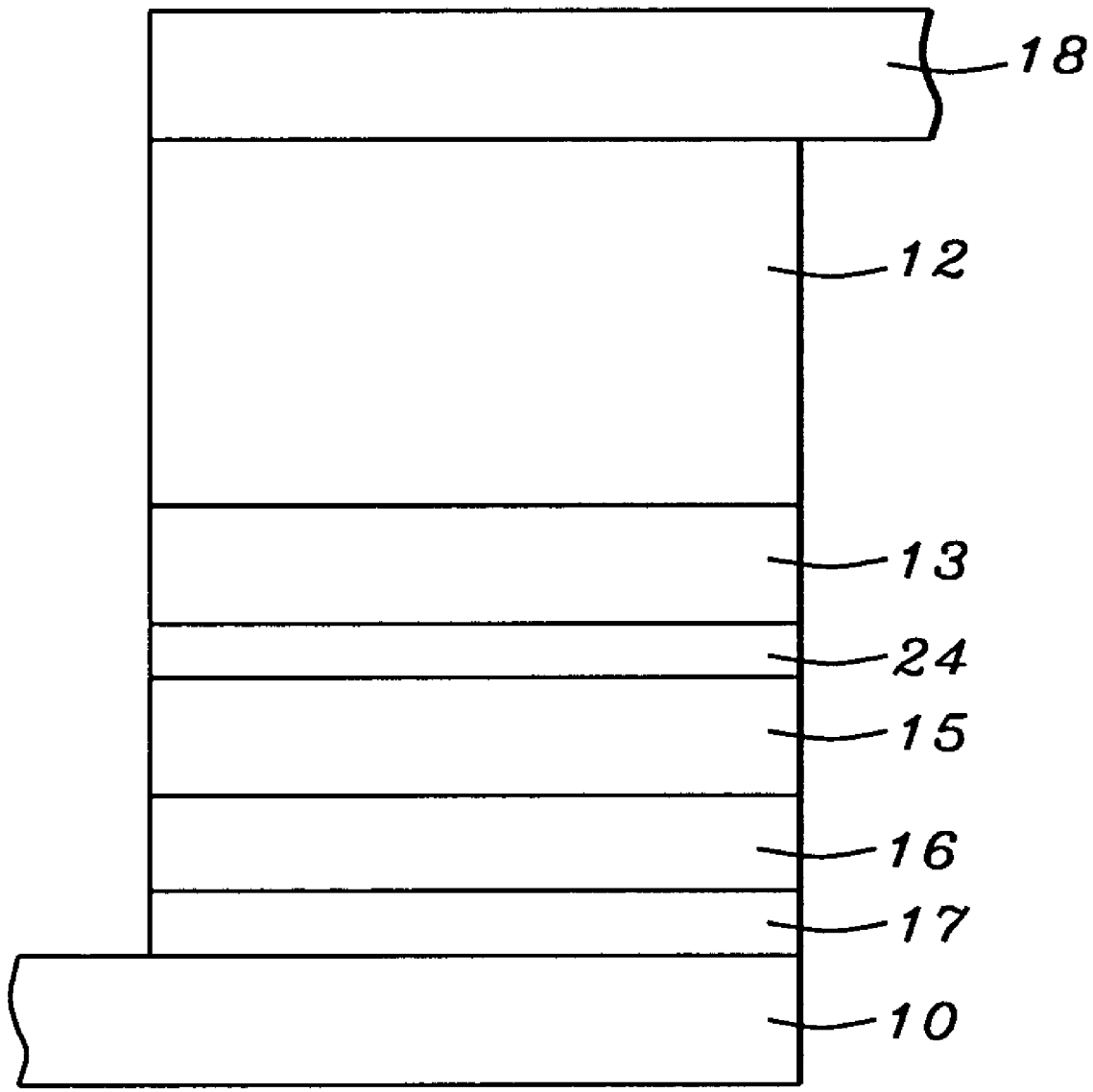
FIG. 3 shows a top spin valve manufactured according to the teachings of the present invention.

In a typical CPP spin valve structure with Ru, AP1/AP2 thickness is in the range of 20–30 Å. It is known that Rh(5–7 Å) has much higher exchange coupling strength than Ru (6–9 Å) when it is sandwiched between two CoFe layers. It is also known that in a CPP spin valve, a thicker AP1 yields a higher GMR and DRA.

Since AP1 and AP2, when coupled through Rh (as opposed to Ru), have a much stronger coupling field, AP1/AP2 thicknesses can be increased while still maintaining comparable performance to Ru and/or having better pinning strength than Ru. This implies that a more stable and/or better performing device can be obtained if Rh is substituted for Ru in a CPP GMR device. These considerations apply to both top and bottom spin valve designs as well as to top or bottom magnetic tunnel junction devices.

We will disclose the present invention through a description of the process for manufacturing a bottom spin valve. This description will also serve to make clear the structure of the present invention. It will be readily understood by those skilled in the art that manufacture of top spin valve designs and magnetic tunnel designs follow along similar lines.

Referring now to FIG. 2, the process of the present invention begins with the deposition on a suitable substrate, such as a magnetic shield (not shown), of lower lead layer 10. Seed layer 11 is then deposited onto layer 10 followed by the deposition of AFM layer 12 which will serve as the pinning layer. Although any antiferromagnetic material could, in principle, be used for layer 12, our preferred choice has been MnPt deposited to a thickness between about 80 and 200 Angstroms.

Next, AP2 layer 13 is deposited to a thickness between 50 and 90 Angstroms and comprises CoFe or NiFeCo. This is followed by the deposition of layer 24 of rhodium, to a thickness between about 5 and 7 Angstroms after which AP1 layer 15 (of similar material to AP2) is deposited onto the rhodium layer to a thickness between 50 and 90 Angstroms. Together, layers 13, 24, and 15 constitute the pinned layer. It is important to note that the thicknesses just quoted for these layers are critical for the satisfactory performance of the device.

Then, follows the deposition of copper spacer layer 16 followed by the deposition thereon of free layer 17 to a thickness between 20 and 50 Angstroms. The latter thickness is important for keeping the total thickness of the device to a minimum. Although any low coercivity material could, in principle, have been used for the free layer, our preferred choice has been CoFe, NiFe, or CoFeNi.

In order for MnPt and AP2 to have exchange coupling, the usual annealing temperature is 250–300° C. The annealing field for CIP device with Ru8 is about 10 kOe but If Rh or Ru4 is used in a CIP device, an annealing field of about 30 kOe is needed.

If Rh and Ru4 are used in a CPP device together with prior art AP1/AP2 thicknesses, an over 20 kOe field is still needed during MnPt annealing. However, if Rh or Ru4 use is accompanied by a thicker AP1/Ap2, we have found that we can reduce the annealing field to less than 8 kOe. This is of great importance to us since it allows us to use our existing ovens, making it economical to manufacture CPP devices that use Rh or Ru4. The optimum conditions for the anneal have been determined to be 280° C. for 5 hours in a 10 kOe field.

The process of the present invention concludes with the deposition, on the free layer, of upper lead layer 18.

It is readily seen from the structure illustrated in FIG. 3 that the process for manufacturing a CPP GMR device of the top spin valve type amounts to a reversal of the order in which the various layers are deposited.

We have not explicitly illustrated top and bottom magnetic junction devices since they may be readily visualized from FIGS. 2 and 3 by simply substituting a layer of insulating material for copper spacer layer 16. Materials most commonly used for the tunneling insulation include $Al_2O_3$ and $ZrO_2$ and they are generally deposited to a thickness between about 5 and 15 Angstroms.

If the various layer thicknesses disclosed above are used, the resulting structure (including the upper and lower leads) has a total thickness that is less than 400 Å. This is important because a small shield-to-shield spacing is required for achieving high linear density.

Confirmatory Results

We have used a bottom spin valve design to demonstrate the effectiveness of the present invention but similar results would be obtained from any of the other designs disclosed above. A two-current-channel model was used to estimate the CPP GMR gain that results from the use of thicker AP1/AP2 with Rh:

Seed/MnPt/CoFe30/Ru8/CoFe30/Cu30/CoFe60/
Cu10/Cap (this is the prior art) Performance:
RA=64 mohmcm$^2$, DRA=0.84 mohmum$^2$, and
GMR=1.31%

Seed/MnPt/CoFe60/Rh6/CoFe60/Cu30/CoFe60/
Cu10/Cap (the present invention) Performance:
RA=70 mohmcm2, DRA=1.3 mohmum$^2$, and
GMR=1.86%

As can be seen, over 40% GMR and DRA gain were obtained by using thicker AP1 and AP2 with Rh.

Besides using Rh, other nonmagnetic other spacers with strong antiferromagnetic coupling, such as Ru 3–4 Å, Ir, etc can also be used to replace Ru 8 Å, currently used by the prior art. Note, however, that 3–4 Å is barely a monolayer so problems with pin-holes make it a less than optimum choice.

We conclude by noting that the magnetic properties of thin films are known to be very sensitive to a number of factors in addition to their composition. Said factors include, but may not be limited to, thickness, deposition conditions, annealing treatments (particularly in the presence of a magnetic field), immediate underlayer, and immediate overcoating. Thus, as a general rule, the parameters that characterize the layers named in the claims to be recited below should be regarded as critical rather than merely optimal.

What is claimed is:

1. A process to manufacture a CPP GMR read head, comprising:

depositing, in succession on a lower lead layer, a seed layer and a pinning layer;

on said pinning layer, depositing a first layer of CoFe to a thickness between 50 and 90 Angstroms;

depositing a layer of rhodium, to a thickness between about 5 and 7 Angstroms, on said first layer of CoFe;

on said rhodium layer, depositing a second layer of CoFe to a thickness between 50 and 90 Angstroms;

on said second layer of CoFe, depositing a copper spacer layer;

on said copper spacer layer, depositing a free layer to a thickness between 20 and 60 Angstroms;

through annealing in a magnetic field between 10 and 15 kOe, for between 300 and 600 minutes at a temperature between 200 and 250° C., causing said first CoFe layer and said pinning layer to become magnetically coupled to one another; and on said free layer, depositing an upper lead layer, thereby forming GMR read head.

2. The process described in claim 1 wherein said pinning layer is MnPt deposited to a thickness between 80 and 200 Angstroms.

3. The process described in claim 1 wherein said CPP GMR read head has a total thickness that is less than 400 Angstroms.

4. The process described in claim 1 wherein said CPP GMR read head has a GMR ratio greater than 2.5%.

5. The process described in claim 1 wherein said free layer is CoFe, NiFe, or CoFeNi.

6. A process to manufacture a CPP GMR read head, comprising:

depositing a free layer, to a thickness between 20 and 50 Angstroms, on a lower lead layer;

depositing a copper spacer layer on said free layer;

on said copper spacer layer, depositing a first layer of CoFe to a thickness between 50 and 90 Angstroms;

depositing a layer of rhodium, to a thickness between about 5 and 7 Angstroms, on said first layer of CoFe;

on said rhodium layer, depositing a second layer of CoFe to a thickness between 50 and 90 Angstroms;

depositing a pinning layer on said second layer of CoFe;

through annealing in a magnetic field between 10 and 15 kOe, for between 300 and 600 minutes at a temperature between 250 and 300° C., causing said second layer of CoFe to become magnetically coupled to said pinning layer; and on said pinning layer, depositing an upper lead layer, thereby forming said CPP GMR read head.

7. The process described in claim 6 wherein said pinning layer is MnPt deposited to a thickness between 80 and 200 Angstroms.

8. The process described in claim 6 wherein said CPP GMR read head has a total thickness that is less than 400 Angstroms.

9. The process described in claim 6 wherein said CPP GMR read head has a GMR ratio greater than 2.5%.

10. The process described in claim 6 wherein said free layer is CoFe, NiFe, or CoNiFe.

11. A process to manufacture a magnetic tunneling read head, comprising:

depositing, in succession on a lower lead layer, a seed layer and a pinning layer;

on said pinning layer, depositing a first layer of CoFe to a thickness between 50 and 90 Angstroms;

depositing a layer of rhodium, to a thickness between about 5 and 7 Angstroms, on said first layer of CoFe;

on said rhodium layer, depositing a second layer of CoFe to a thickness between 50 and 90 Angstroms;

on said second layer of CoFe, depositing an insulated tunneling layer;

on said insulated tunneling layer, depositing a free layer to a thickness between 20 and 50 Angstroms;

through annealing in a magnetic field between 10 and 15 kOe, for between 300 and 600 minutes at a temperature between 250 and 280° C., causing said first CoFe layer to be magnetically coupled to said pinning layer; and on said free layer, depositing an upper lead layer, thereby forming said magnetic tunneling read head.

12. The process described in claim 11 wherein said pinning layer is MnPt deposited to a thickness between 80 and 200 Angstroms.

13. The process described in claim 11 wherein said magnetic tunneling read head has a total thickness that is less than 400 Angstroms.

14. The process described in claim 11 wherein said magnetic tunneling read head has a GMR ratio greater than 20%.

15. The process described in claim 11 wherein said free layer is CoFe.

16. A process to manufacture a magnetic tunneling read head, comprising:

depositing a free layer, to a thickness between 20 and 50 Angstroms, on a lower lead layer;

depositing an insulated tunneling layer on said free layer;

on said insulated tunneling layer, depositing a first layer of CoFe to a thickness between 50 and 90 Angstroms;

depositing a layer of rhodium, to a thickness between about 5 and 7 Angstroms, on said first layer of CoFe;

on said rhodium layer, depositing a second layer of CoFe to a thickness between 50 and 90 Angstroms;

depositing a pinning layer on said second layer of CoFe;

through annealing in a magnetic field between 10 and 15 kOe, for between 300 and 600 minutes at a temperature between 250 and 280° C., causing said second CoFe layer to be magnetically coupled to said pinning layer; and on said pinning layer, depositing an upper lead layer, thereby forming said magnetic tunneling read head.

17. The process described in claim 16 wherein said pinning layer is MnPt deposited to a thickness between 80 and 200 Angstroms.

18. The process described in claim 16 wherein said magnetic tunneling read head has a total thickness that is less than 400 Angstroms.

19. The process described in claim 16 wherein said magnetic tunneling read head has a GMR ratio greater than 20%.

20. The process described in claim 16 wherein said free layer is CoFe, NiFe, or NiFeCo.

* * * * *